United States Patent [19]

Bartholomew

[11] Patent Number: 5,002,315
[45] Date of Patent: Mar. 26, 1991

[54] QUICK CONNECTOR

[75] Inventor: Donald D. Bartholomew, Marine City, Mich.

[73] Assignee: Proprietary Technology, Inc., Southfield, Mich.

[21] Appl. No.: 482,873

[22] Filed: Feb. 20, 1990

Related U.S. Application Data

[63] Continuation of Ser. No. 178,550, Apr. 7, 1988, Pat. No. 4,943,091.

[51] Int. Cl.$^5$ ............................................. F16L 35/04
[52] U.S. Cl. ..................................... 285/93; 285/319; 285/921
[58] Field of Search .......................... 285/319, 921, 93

[56] References Cited

U.S. PATENT DOCUMENTS

| 4,423,892 | 1/1984 | Bartholomew | 285/921 X |
| 4,601,497 | 7/1986 | Bartholomew | 285/319 |
| 4,743,051 | 5/1988 | Proni | 285/319 |
| 4,846,506 | 7/1989 | Bocson et al. | 285/319 X |

Primary Examiner—Dave W. Arola
Attorney, Agent, or Firm—Harness, Dickey & Pierce

[57] ABSTRACT

A releasable, swivelable, quick connector assembly comprises a tubular male member, a tubular female member having an end portion configured to mate with the male member when inserted therewithin, and a retainer member including means for preselectively resisting assembly of said male member into said female member where said retainer is preassembled onto male member and where said retainer is preassembled into said female member.

2 Claims, 2 Drawing Sheets

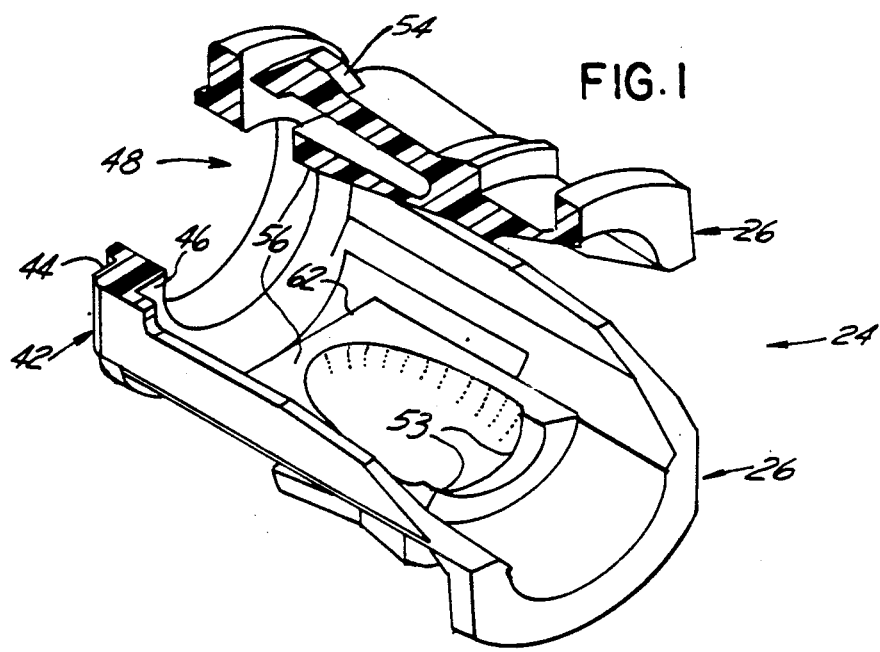
FIG. 1
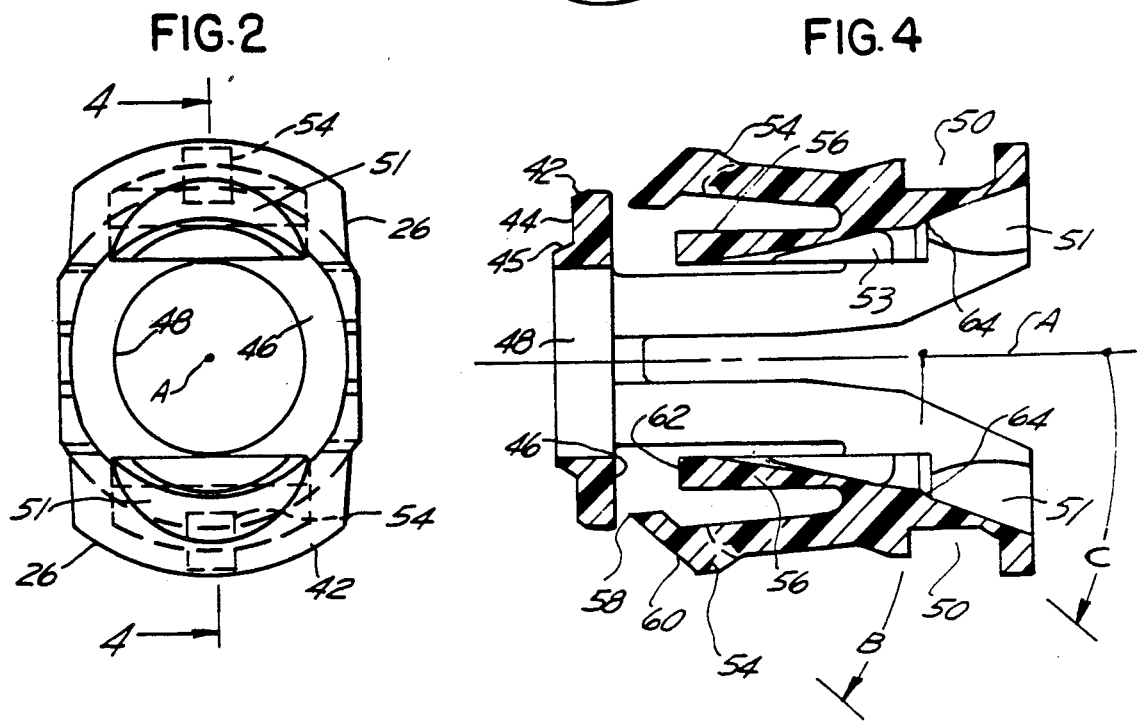
FIG. 2
FIG. 4
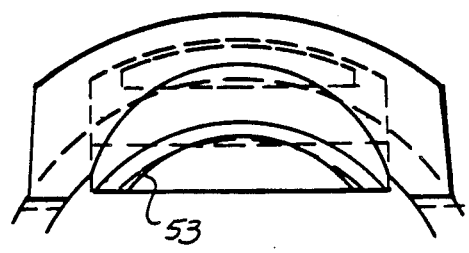
FIG. 3

QUICK CONNECTOR

This is a continuation of U.S. patent application Ser. No. 178,550, filed Apr. 7, 1988, entitled "Quick Connector", now U.S. Pat. No. 4,943,091 issued Jul. 24, 1990.

BACKGROUND AND SUMMARY OF THE INVENTION

This invention relates to a quick connector and more particularly to a retainer member allowing a quick yet swivelable connection.

Numerous applications require a quick connection between fluid carrying conduits. Oftentimes in quick connections the user is not certain that the desired interconnection was fully completed possibly resulting in unexpected and undesired disconnection of the conduits. It would be desirable to provide a connection that is quick and certain such connection as achieved by an installer axially thrusting a male conduit into a suitably configured female receptacle with an audible signal resulting to indicate that the interconnection was completed. Also, in the event that the completion of the connecting motion is not properly completed, it is desirable that the retaining mechanism provide means by which the male portion of the connector be prevented from complete separation. If this means could further result in a situation where a very limited leak from the connection would provide visual evidence of an improperly "made" connection, then the evidence of that condition would result in an indication of the problem during the confirming operation of the system.

A primary object of the present invention is provision of a retention arrangement which may be used to interconnect a pair of mateable conduit end portions and which resists assembly unless a significant assembling force is applied.

Another object of the invention is provision of a conduit having a retainer member preassembled to the conduit end portion so that a connection thereto by a tubular fluid conveying conduit may be made in one step without resorting to any tools.

Another object of the invention is provision of a retainer element which may be preassembled to either conduit so that a snapping connection may be made, with the retainer assembled into the female portion, or mounted on the male portion and inserted with the male into the female.

Another object of the invention is to provide a retaining means which will sufficiently secure the male in the female sufficiently to prevent a blow apart of the male from the female even though the primary latching means has not been completely operated during the connection movement of the male into the female portion.

It is another object of the present invention to provide an improved retainer element formed with at least one leg member which operates to detachably secure the retainer element to either conduit and which allows releasable, rotatable connection, the retainer element having first and second cam surfaces which resist assembly to one or the other of the conduits.

In accordance with the present invention there is provided a connector assembly, comprising, a tubular male member having a mating end portion, a tubular female member having an end portion defining a receptacle configured to mate with the male member when inserted therewithin, and a retainer member including assembly resisting means for preselectively resisting assembly of the mating end portion of the male member into the receptacle of the female member where the retainer member is preassembled onto the male member and where the retainer member is preassembled into the female member.

Additional objects and advantages of the present invention will become apparent from reading the detailed description of the preferred embodiments which makes reference to the following set of drawings:

BRIEF DESCRIPTION OF THE DRAWINGS

FIG. 1 is a perspective view partially in section of a retainer member in accordance with the present invention, including a pocket which holds a tube bead in a retained but not sealed position;

FIG. 2 is an elevation view of the retainer member;

FIG. 3 is an enlarged view showing detail of the retainer member shown in FIG. 2;

FIG. 4 is a side elevation view in section taken along line 4—4 of the retainer member shown in FIG. 2;

DETAILED DESCRIPTION OF THE PREFERRED EMBODIMENT

Figure 5:
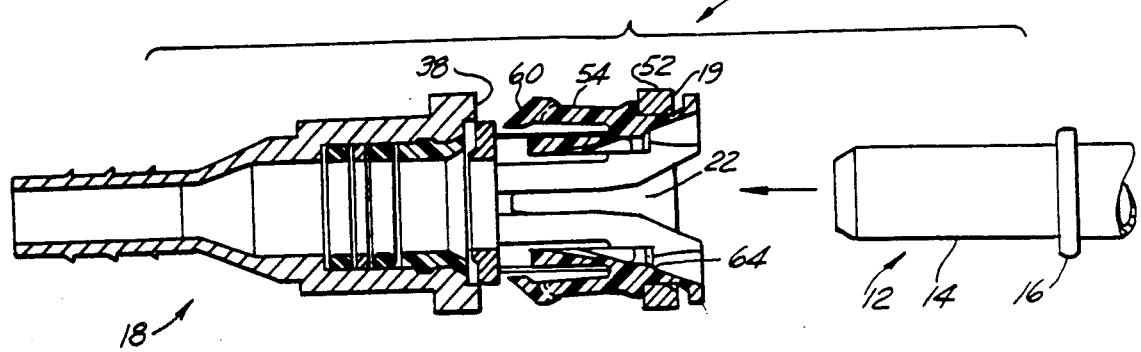
FIGS. 5, 6 and 7 are side views in section wherein the retainer member has been preassembled into a female conduit sized to receive a male conduit and show progressive assembly between the conduits.

A rotatable swivelable quick connector is shown and designated by reference numeral 10. The quick connector 10 comprises a cylindrical tubular male conduit 12 having a mating end portion 14 provided with a rounded annular retention collar 16 axially rearward of its front mating end, a cylindrical tubular female conduit 18 having a mating end portion 20 provided with a pair of openings 22, end portion 20 defining a receptacle sized to receive the male conduit when it is inserted therewithin, and a retainer member 24 provided with a pair of resiliently deflectable arms 26 each respective arm being partially received in one or the other opening. The retainer member is adapted to be preassembled to one or the other conduit with the arms cooperating to resist preassembly and also to releasably connect the two conduits together. The interconnection is formed as the result of the conduits being axially thrust together generally along a mating axis which is also the central axis of the mating conduits.

Female conduit 18 includes a stepped interior bore extending rearwardly from its forward end 19 with a portion of the bore wall defining an annular recess sized to receive annular O-ring seals 28, an annular square sectioned spacer 30 and an annular bushing 32 having a mating face 34 angled relative to the central axis for purpose of leading in and supporting the male member, each seal being comprised of a resilient elastomeric material and having a thickness dimension in the radial direction selected so as to form a radially compressing fitment about and between the outer periphery of male conduit and the inner wall of the recess whereby to form a fluid tight connection therebetween. Each opening 22 includes a pair of longitudinally extending sidewalls 36, a forwardly facing axial endwall 38 and a rearwardly facing axial endwall 40. An annular wall portion 52 is formed between rearwardly facing endwall 40 and forward end 19.

Retainer member 24 is integrally molded of a polymeric material such as nylon and includes an annular collar 42 having axial faces 44 and 46 and a central opening 48 extending between the faces and sized to pass mating end portion 14, and the two arms 26 each arm extending perpendicularly from axial face 46. Face 44 includes an annular wedge-shaped edge 45 which adds stiffness to annular collar 42. Each arm has a radially deflectable free end portion 51 in which is formed an outwardly opening channel portion 50 that is adapted to receive the annular wall portion 52 whereby the retainer is releasably retained in the receptacle.

Arm 26 includes a pair of arcuate, radially spaced, locking beams 54 and 56 each locking beam having one end integrally secured to end portion 51 adjacent to channel 50 and extending generally axially from its securement towards annular collar 42. Locking beam 54 is radially outward from and superposes its associated locking beam 56 and terminates in a free end 58 spaced axially from axial face 46. A free end portion 60 adjacent the free end 58 is radially deflectable relative to the central axis of the retainer member. In accordance with this preferred embodiment the free end portion 60 is disposed at an acute angle "B" relative to the central axis "A", such angle being greater than 30° and less than 70°. In one application an acute angle of about 60° degrees was found to be sufficient to resist axial insertion of the male member until the user applied sufficient insertion force to overcome the retainer resistance by camming the free end portions 60 radially inward.

Locking beam 56 includes a free end 62 spaced axially from axial face 46 by an amount slightly greater than the width of annular retention collar 16 and an angled surface 64 which is adapted to resist entry of retention collar 14 of male member 12 until the retention collar 14 deflects locking beam 56 radially outward allowing the retention collar to pass and be captivated axially between end face 46 and free end 62. Inward of surface 64 is a partial pocket 53 which will retain the annular collar 14 of male end 12, should collar 14 not be thrust sufficiently inward to be captured in the space between end face 46 and free end 62.

Figure 6:
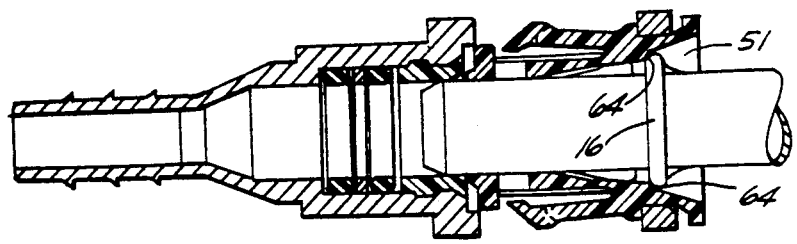
Figure 7:
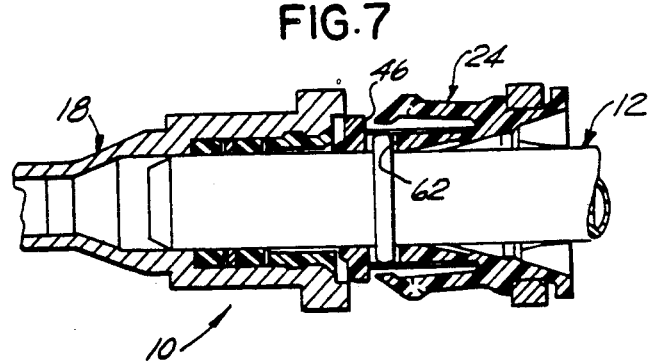

In accordance with this invention retainer member 24 may either be preassembled and locked onto mating end portion 14 of male member 12 prior to mating with female member 18 (see FIG. 8) or preassembled into receptacle 22 of female member 18 prior to mating with male member 12 (see FIG. 5). In FIG. 5, preassembly of retainer member 24 results from axially positioning angled end faces 60 adjacent end face 19 and driving the retainer against annular wall portion 52 thereby causing locking beam 54 to be deflected radially inwardly until the retention member enters the receptacle and channel 50 snaps into engagement with annular wall portion 52. Thereafter, female 24 conduit has a retainer preassembled therewith for receiving male member 12. Axial inward insertion of male member 12 causes retention collar 16 thereof to engage angled faces 62 (see FIG. 6) with continued increasing axial force deflecting locking beam 56 radially outward whereupon male end 14 rapidly enters the female portion 18 until retention collar 16 is seated between end face 62 and axial face 46 (see FIG. 7).

Figure 8:
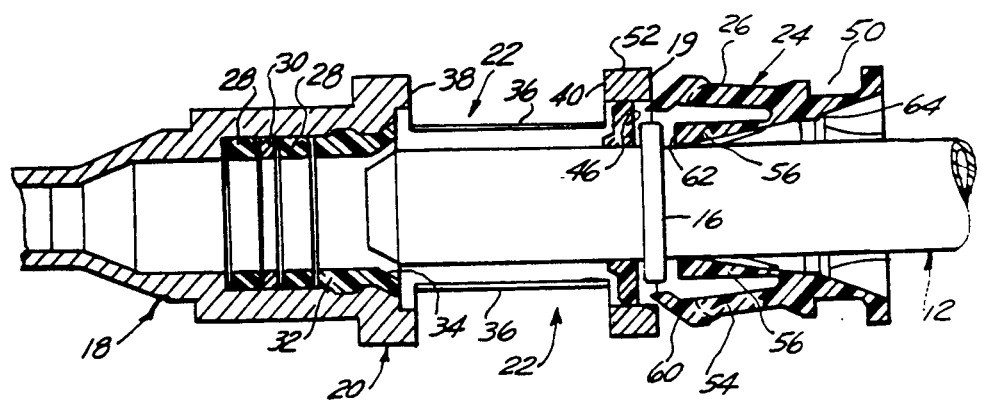
FIG. 8 is a side view in section similar to FIGS. 5-7 to show assembly when the retainer member is preassembled onto the male conduit.

As shown in FIG. 8, retainer member 24 is preassemble onto end portion 14 of male member 12 by inserting mating portion 14 into retainer member 24 such that annular retention collar 16 first engages angled face 64 and deflects locking beam 56 radially outward allowing retention collar 14 to pass and be seated axially between axial face 46 and end face 62. Thereafter male member 12 carrying preassembled retainer member 24 is driven against the end face 19 of the female conduit causing end face 60 of locking beam 54 to engage annular wall portion 52 and be deflected radially inward allowing the retainer and male member to suddenly pass into female portion 18 until the channel 50 seats in annular wall portion 52.

In either assembly, the male and female conduits are capable of rotational (swivelable) movement relative to one another and removability is possible by depressing end portions 51 radially inward (whereby retainer 24 may be released from the receptacle) or by coaxial insertion of a blade (not shown) between the outer periphery of male member 12 and inner surface of locking beam 56.

Accordingly, there is provided a retainer which resists insertion of the mating male portion of the connection until the installer applies enough push in force to result in the male rapidly traveling completely and locking when the retainer resistance is overcome. Locking beam 54 produces the same effect if the retainer is mounted and locked on the male portion and both are being installed in the female.

Additionally pocket 53, and the projection 60 on beam 54 resisting withdrawal of retainer member 24 from female portion 18, act to secure a partially assembled male and female portion as explained earlier.

Note that the female housing may be of metal construction with or without the openings 22, only the annular wall portion 52 is necessary to engage retainer 24. Also, retainer 24 may be constructed from metal, provided the deflections that are required are possible as a result of the design and material or materials.

While the above description constitutes the preferred embodiments of the present invention, it will be appreciated that the invention is susceptible to modification, variation and change without departing from the proper scope and fair meaning of the subjoined claims.

I claim:

1. A connector assembly, comprising:

a first fluid carrying conduit having a tubular male member and defining a radially disposed first latching surface;

a second fluid carrying conduit having a tubular female member having an end portion configured to mate with said male member, said female member having means defining a second radially disposed latching surface, and a retainer member adapted to be positioned within said female member, said retaining member comprised of a first portion and a locking portion member comprised of a first portion and a locking portion extending from said first portion, said first portion adapted to enable passage of said first fluid carrying conduit by said first portion and to be positioned about said first fluid carrying conduit adjacent said first latching surface, said locking portion having first and second retaining faces adapted for engagement with said first and second latching surfaces, respectively, for retaining said male and female members in latched engagement, said locking portion of said retainer member extending in an axial direction, said locking portion being partially deflectable in response to partial axial insertion of said male member into said female member, said locking portion being so constructed and arranged for providing a gradually increasing axial force resisting further insertion of said male member into said female member, whereupon when the force required to achieve complete deflection of said locking portion is exerted on said locking portion, said locking portion suddenly yields, enabling the male member to suddenly move axially inwardly of the female member at such a rapid rate as to assure that the first and second retaining faces of said locking portion are disposed in positive locked relation to said first and second latching surfaces, respectively, whereby said first and second fluid carrying conduits are disposed in latched fluid communicating relation with one another.

2. The connector assembly as recited in claim 1 wherein said said first latching surface on said male member includes a radial shoulder having an axial mating face, and said locking portion comprises a longitudinal radially deflectable locking beam having an acutely angled mating surface relative to a central mating axis adapted to interengage with said shoulder on said male member and resist connection but deflect upon attainment of said predetermined force whereby to pass said male member into said female member.

* * * * *